Figure 10:
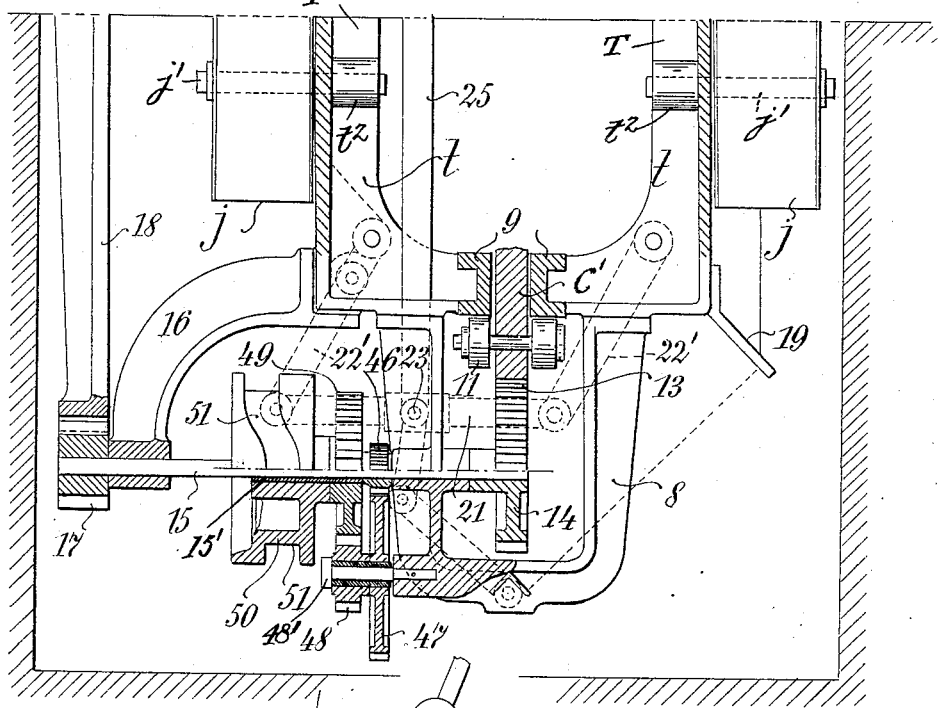

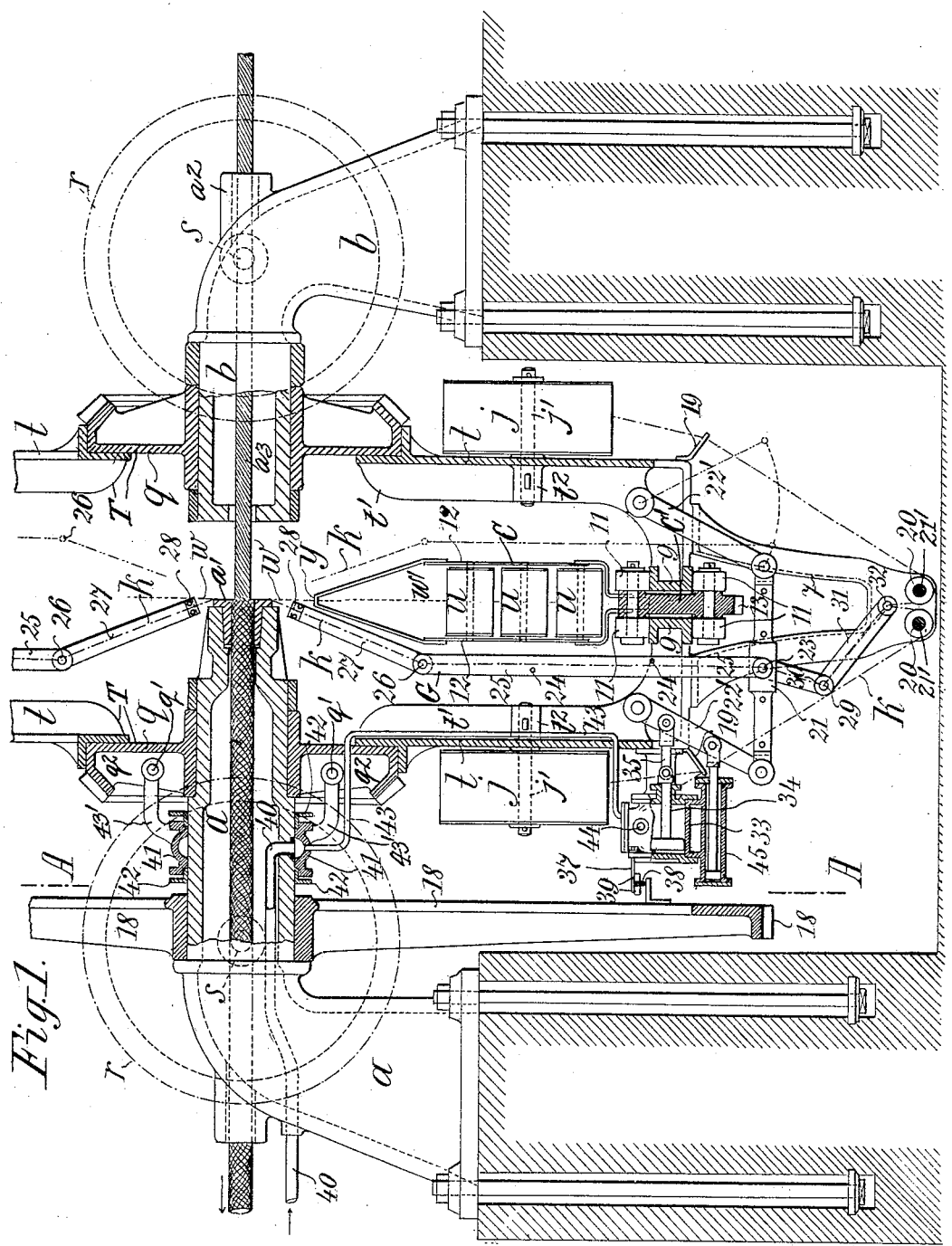

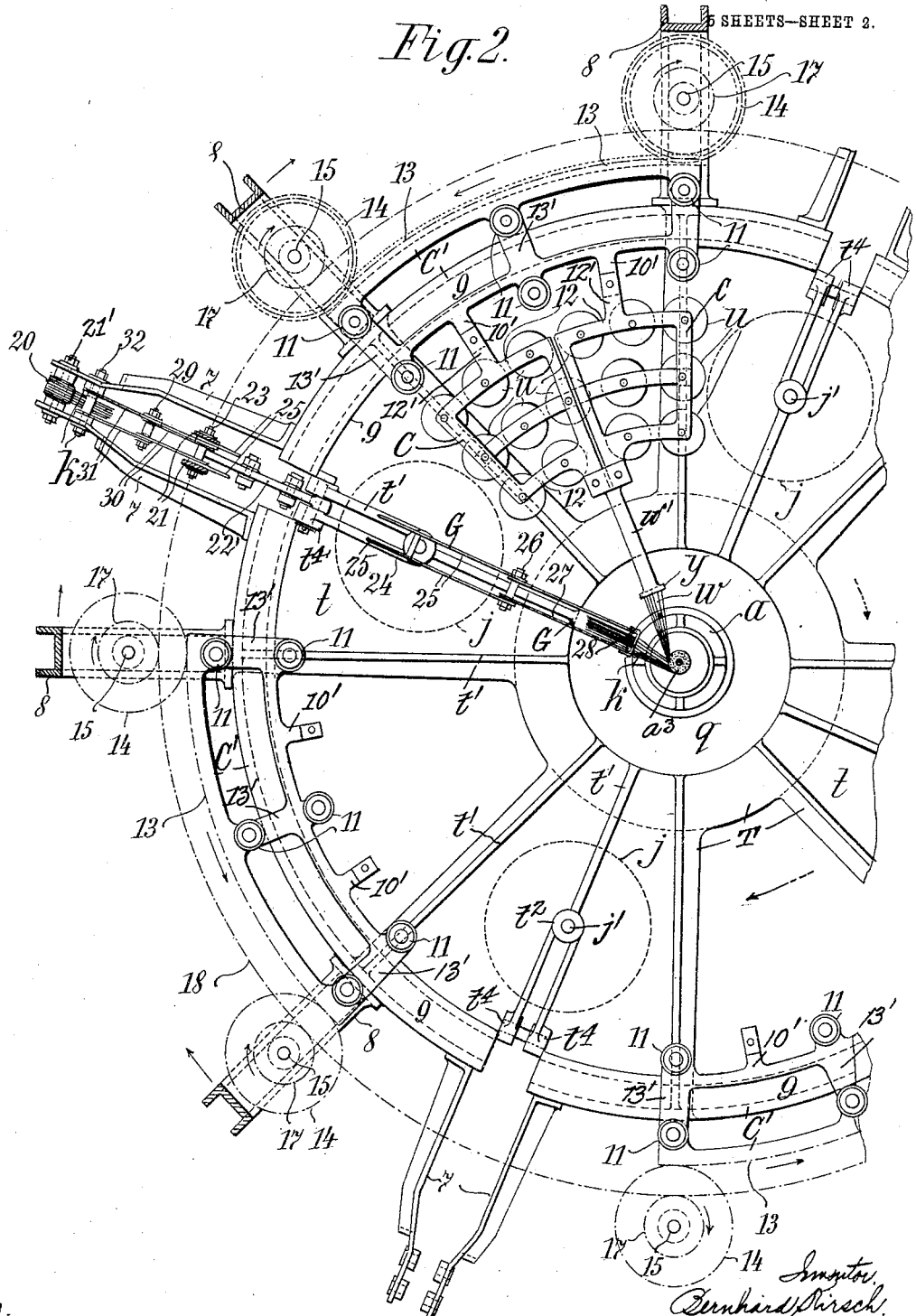

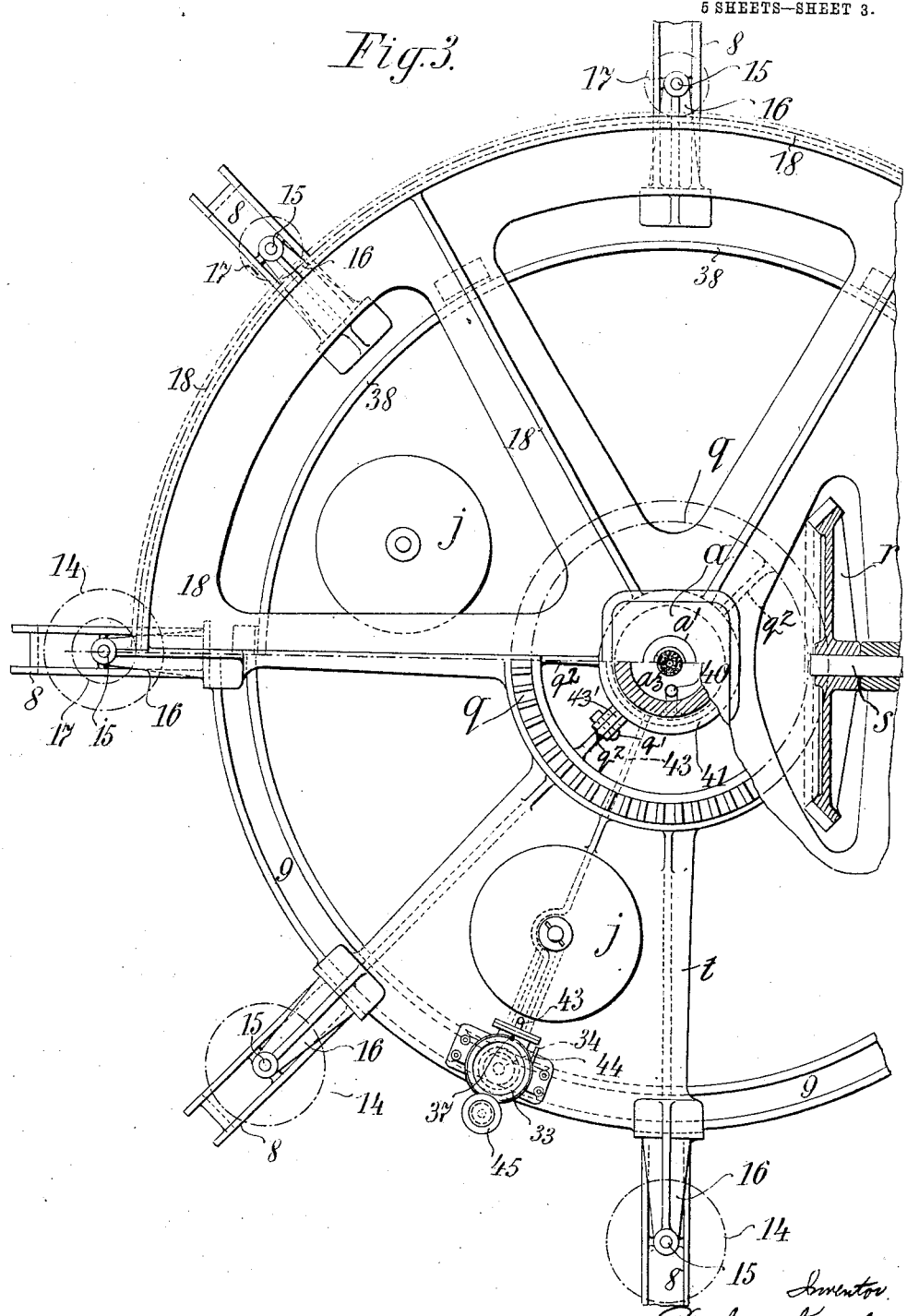

No. 784,686. PATENTED MAR. 14, 1905.
B. KIRSCH.
BRAIDING MACHINE.
APPLICATION FILED JULY 7, 1902.
5 SHEETS—SHEET 4.
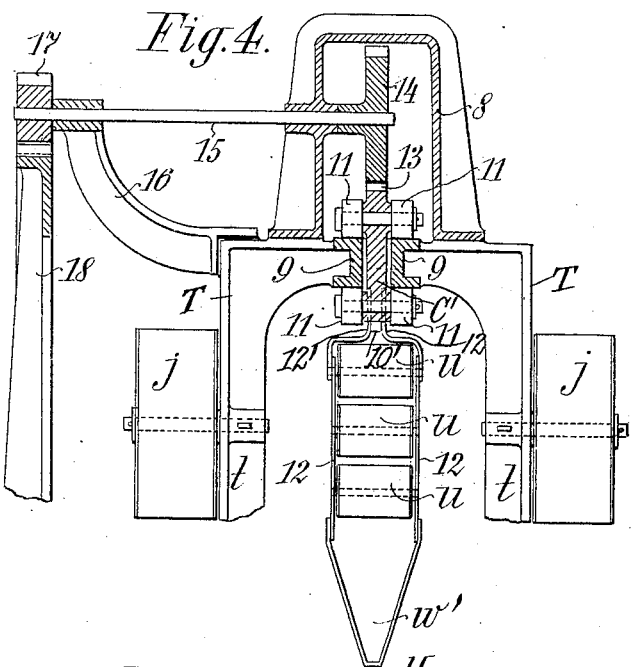
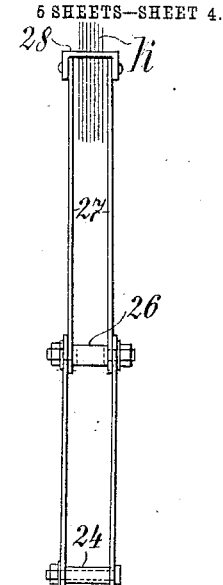
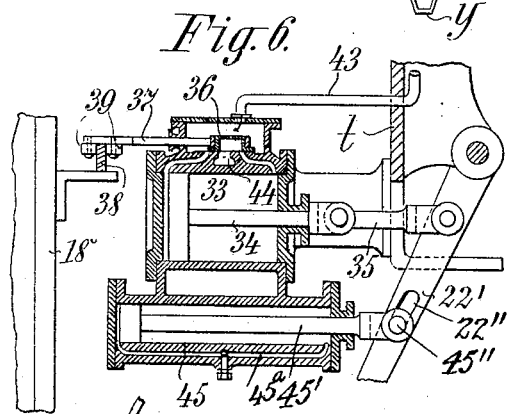
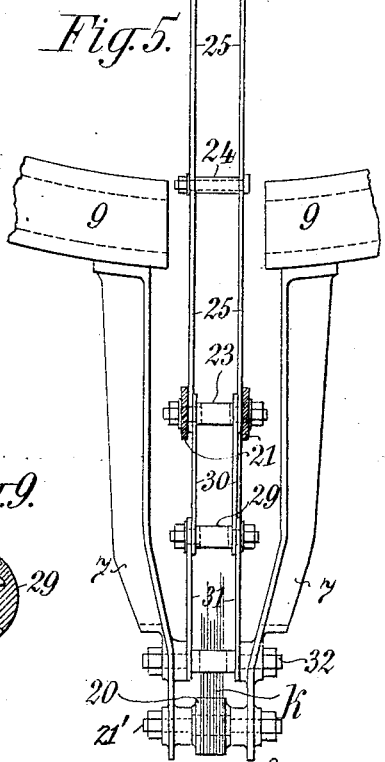
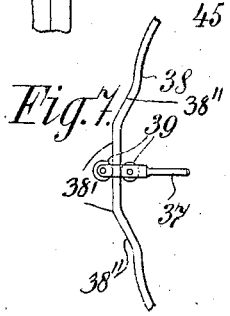
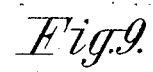
Witnesses
Inventor
Bernhard Kirsch
by Neury Orth & Co
Attys No. 784,686. PATENTED MAR. 14, 1905.
B. KIRSCH.
BRAIDING MACHINE.
APPLICATION FILED JULY 7, 1902.

5 SHEETS—SHEET 5.

No. 784,686.

Patented March 14, 1905.

UNITED STATES PATENT OFFICE.

BERNHARD KIRSCH, OF VIENNA, AUSTRIA-HUNGARY, ASSIGNOR OF ONE-HALF TO ADOLF PESSL, OF VIENNA, AUSTRIA-HUNGARY.

BRAIDING-MACHINE.

SPECIFICATION forming part of Letters Patent No. 784,686, dated March 14, 1905.

Application filed July 7, 1902. Serial No. 114,607.

*To all whom it may concern:*

Be it known that I, BERNHARD KIRSCH, a subject of the Emperor of Austria, residing at Vienna, in the Province of Lower Austria, in the Empire of Austria-Hungary, have invented certain new and useful Improvements in Braiding-Machines; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention has relation to braiding-machines, and more particularly to machines for braiding thread on a core moving in a straight line and to that type of machines shown and described in Letters Patent of the United States granted to me December 30, 1902, under No. 717,415, in which one series of threads is spirally wound upon a core moving in a straight line, while another series of threads, also wound about the core, but in an opposite direction, is caused to periodically cross the first series of threads for the formation of the braiding. This is effected in the machine shown in the patent referred to by periodically transferring the bobbins of the crossing series of threads on one side of the path of the threads to be crossed to the opposite side thereof. Practice has shown that the described manner of crossing the threads has certain disadvantages, the greatest of which lies in the difficulty of maintaining the crossing threads at a constant uniform tension. On the other hand, the rapid transfer of the heavy bobbins revolving about the core from one side of the path of the threads to be crossed to the other results in shocks and rebounds which interfere to some extent with the good operation of the machine.

The present invention has for its object the provision of means whereby these disadvantages are obviated, and this I attain by providing comparatively light thread-guides for the crossing threads and appliances for imparting to said guides a traversing motion across the path of the threads to be crossed or in a plane parallel to the straight line of motion of the core, or substantially so.

In machines of the kind under consideration and as heretofore constructed the thread-delivery end of the thread-guides of one or both series of such are quite remote from the point where the braiding takes place, and if there is a slack in a thread from one or more bobbins of one series entanglement with the thread or threads from a bobbin or bobbins of the second series is liable to take place. This liability to entanglement I practically avoid by constructing and arranging the two series of thread-guides in such a manner that their delivery ends will move in such close proximity to the point at which the braiding takes place as to leave only sufficient clearance for the crossing or interlacing of the threads.

The invention has for its further object other improvements, as will now be fully described, reference being had to the accompanying drawings, in which—

Figure 11:
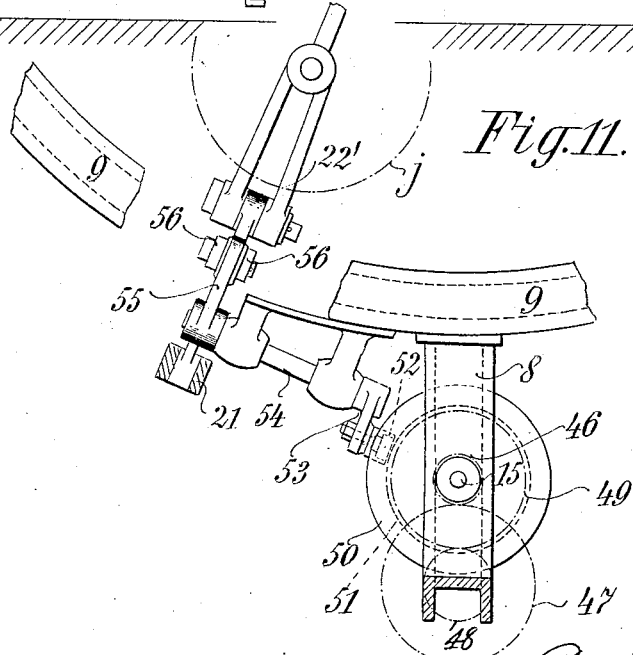

Figure 1 is a vertical longitudinal fragmentary sectional view of a braiding-machine embodying my invention. Fig. 2 is a fragmentary vertical central transverse section showing the left-hand part of the machine, together with one of each set of thread-guides and bobbin-carriers in elevation. Fig. 3 is a fragmentary sectional view on line A A of Fig. 1, showing a left-hand elevation of one-half of wheel 18, the lower half of which is removed. Fig. 4 is a detail sectional view illustrating the mechanism for revolving one set of thread-guides about a core to be braided. Fig. 5 is a detail view of one of the guides for the crossing threads and its connections with the machine. Fig. 6 is a sectional detail view illustrating one means for imparting a traversing motion to the guides for the crossing threads. Fig. 7 is a fragmentary plan-view of the cam track or ring and its connection with the slide-valve rod of the engine (shown in Fig. 6) for controlling the slide-valve. Fig. 8 is a fragmentary elevation, partly in section, of one of the bolts which connect the side plates of the traversing thread-guides shown in Fig. 5. Fig. 9 is a cross-section of said bolt. Fig. 10 is a fragmentary sectional detail view showing appliances for imparting a traversing motion to the thread-guides shown in Fig. 5 different from those shown in Figs. 6 and 7, and Fig. 11 is a left-hand side elevation thereof.

In Fig. 1 and as a matter of convenience I have shown the machine mounted on hollow horizontal extensions of two standards $a$ and $b$, one on each side of a pit, each standard having a guide-passage $a^2$ to guide the core $a^3$ to the horizontal extension of standard $b$ and the braided core from the horizontal extension of standard $a$, the core moving in the direction of arrow, and there is a space between the proximate faces of said horizontal extensions of the standards where the braiding of the core is effected, a thimble $a'$ being inserted in the inner end of the horizontal extension of standard $a$ for pressing the braiding onto the core, as usual.

On the horizontal member of standard $a$ is secured a large gear-wheel 18, and on said member and on the like member of standard $b$ is rotatably mounted a carrier T, common to all the bobbins of the machine. This carrier T consists of two parallel wheels having peripheral bracket extensions 7 and 8, and centrally between them and flush with their peripheries two suitably-spaced rails 9 9, of U shape in cross-section, the hub of each wheel consisting of a bevel-wheel $q$, loosely mounted on the horizontal or bearing members of the standards $a$ and $b$, said wheels having an internal circular flange, Fig. 1, bolted to said bevel-wheels.

The bobbin-carrier is rotated through the medium of bevel-wheels $r$, in gear with bevel-wheels $q$ and mounted on shafts $s$, any suitable well-known means being provided for rotating the bevel-wheels $r$ in opposite directions—as, for instance, bevel-gearing on a main driving-shaft suitably geared to bevel-gears on shafts $s$—mechanism which I have deemed unnecessary to illustrate, as such mechanism is well known.

The radial bracket extensions 7 and 8 are arranged as shown in part in Fig. 2—namely, there is one bracket 7 between alternate pairs of brackets 8, for purposes hereinafter explained.

The spokes or radial arms $t$ of the wheels of carrier T are provided with strengthening-ribs $t'$, of which I have shown three on each spoke, the wheels being in practice made as light as possible. The central rib of each spoke has a bearing $t^2$ for the spindle $j''$ of a bobbin $j$, the outer part of said rib being bifurcated and provided with a bearing $t^4$ for purposes presently described.

With a view to increasing the capacity of the bobbin-carriages to a maximum and with a view to reducing their weight to a minimum each carriage comprises a bobbin-frame of the general form of a sector, and said frame is made up of two similar frames, consisting of two skeleton members 12, composed of two similar light converging or radial bars connected together by a plurality of similar light segmental bars, as clearly shown in Figs. 1, 2, and 4.

The outer segmental bar of each frame member 12 of the two frames has a central radial extension or lug 12', each pair of lugs thus provided being bolted or otherwise detachably secured to companion lugs 10' projecting radially from the wheeled element or body C' of the carriage C.

The proximate radial-bars of the frame members of the two frames are extended inwardly, and to said extensions is bolted or otherwise detachably secured the thread-guide $w'$, above referred to, so that by disconnecting the bobbin-frames from the wheeled body C' and removing the thread-guide the skeleton-frame members 12 can be separated for the removal of empty bobbins and the substitution of full ones.

The wheeled body C' is composed of concentric segments connected at either end and midway between said ends by radial bars 13' and is guided between the two rails 9 9 of the circular track and provided with bearings for the spindles of wheels 11, arranged to travel along opposite faces of said track-rails, as clearly shown in Figs. 1, 2, and 4.

In view of the sectoral shape of the bobbin-frames 12 I am enabled to mount therein a comparatively larger number of bobbins $u$ than would be the case otherwise, and the object of connecting these frames detachably to the wheeled body C' is to facilitate their removal when the thread of the bobbins is exhausted and the substitution of frames with full bobbins or the removal of the empty bobbins from the frames and the substitution therefor of full bobbins.

The outer segmental member 13 of the wheeled body C' of the carriage C is provided with gear-teeth, and said member as well as the inner member and the segmental members of the bobbin-frames are concentric with the circular track 9 9, as will be readily understood.

It has hereinbefore been stated that the carrier T serves to carry all the bobbins of the machine, but that one set of such bobbins is caused to rotate about the core in a direction opposite to the direction of rotation of a second set of bobbins and that the bobbins $j$ are mounted on the carrier T and rotate therewith.

The following mechanism is provided for rotating the carriages C with their bobbins $u$ in a direction opposite to the direction of rotation of the carrier T, reference being had to Figs. 2 and 4. In each radial bracket or yoke 8 is mounted one end of a spindle 15, whose opposite end has its bearing in an arm 16, projecting from the carrier T. Each spindle 15 carries two gear-wheels 14 and 17 of different diameter, the smaller gear or pinion 17 meshing with the large stationary wheel 18 and the gear-wheel 14 with the toothed member 13 of the wheeled body C' of a bobbin-carriage C. As stated above, there are two such yokes 8 for each bracket extension 7, and the arc of the circle of the toothed member 13 of the carriage is of such length as to be at all times in gear with at least one of the wheels 14. It is obvious that if the carrier T is rotated, for example, in the direction of dotted arrow Fig. 2 the carriages C will be caused to travel along the track 9 9 in an opposite direction, as indicated by full-line arrows, while the gearing 18, 17, and 14 is so proportioned that the carriages C and carrier T will move about the core $a^3$ to be braided at one and the same angular velocity.

The bobbins $j$ are loosely mounted on their spindles $j'$ on the outside of the radial arms $t$ of carrier T, Fig. 1, the thread or threads thereof passing through guide-plates 19 over rollers 20, whose pins 21' connect together the two members of the radial brackets 7, said threads passing over the rollers 20 to thread-guides G, having at their inner end a thread-guide plate 28, it being supposed that four such guides are provided as an example and as will be clearly understood from Fig. 2. As more clearly shown in Fig. 5, these thread-guides G are each composed of two plates 25, properly spaced relatively to the number of threads carried between them by bolts 24, and of two similar plates 27, pivotally connected by a bolt 26 to the inner ends of the plates 25, so that the inner member of the guide formed by the plates 27 may vibrate to and fro under the stress of its threads when traversed across the path of the threads coming from the thread-guides $w'$, which rotate about the core $a^3$ in the opposite direction. The bolts 24 also serve as guides for the threads coming from bobbins $j$, said bolts being staggered, as shown in Fig. 1.

In the bearings $t^2$, hereinabove referred to, at the outer end of the central bifurcated ribs $t'$ of proximate radial arms $t$ of carrier T is seated a pin, and to each pin is pivoted a link 22' 22', which links form part of a parallel motion organized to impart to the thread-guides G a traversing motion across the path of the threads $w$, coming from the revolving thread-guides $w'$. One of the links 22' is pivoted to one end of a horizontal bar 21 of the parallel motion, and the other link 22' is pivoted to the opposite end of said bar 21, to which are rigidly secured midway of its length by a pin 23 the outer ends of plates 25, which constitute the outer member of the thread-guide G.

To the pin 23, that connects the plates 25 to bar 21, is pivoted one end of a pair of links 30, whose opposite ends are pivoted to a pin 29, to which one end of a pair of links 31 is pivoted, the opposite end of said links 31 being pivoted to a pin 32, that also serves to connect the two members of a yoke or bracket 7.

It is obvious that by imparting vibrating motion to the links 22' 22' a horizontal to-and-fro or reciprocating motion will be imparted to the horizontal bar 21 and therethrough to the thread-guide G alternately from one side to the other of the plane of rotation of the thread-guide $w'$, as indicated in dotted lines in Fig. 1, said guides $w'$ rotating about a straight line or the core $a^3$ in a plane normal thereto, and as the guides $w'$ have converging sides and in order to bring the threads $k$ from the guides G as close as possible to the threads $w$ from the delivery end $y$ of the guides $w'$ and as close as possible to the point where the braiding takes place I connect the inner member 27 of the guides G pivotally to the outer member 25 of said guide, so as to enable said inner member 27 under the stress of its threads to swing toward or close to the path of the threads from the guides $w'$, as shown in Fig. 1.

To obviate the necessity of carrying the threads $k$ from the bobbins $j$ over the pins or bolts 23, 26, 29, and 32 and with a view to properly guiding said threads to the perforated guide-plates 28 at the inner end of the guides G, I construct said pins or bolts, as shown in Figs. 8 and 9, by slotting longitudinally and flaring the slot outwardly on opposite sides of the axis of the pin and securing in the inner half of the slot a perforated guide-plate $m$.

In machines of the type described as heretofore constructed it is extremely difficult, if not impossible, to maintain the crossing threads at a uniform tension, especially when the bobbins carrying the crossing or interlacing threads are bodily transferred from one side to the other of the path of the threads that revolve in a circle in a direction opposite to the direction of rotation of the crossing threads. By means of the two links 30 and 31 this difficulty is effectually obviated, because their length does not vary during the reciprocations of the bar 21. Hence there is no slack and stress on the threads coming from the bobbins $j$ during the movements of said bar 21, as will be readily understood.

In order to permit the described traversing motion of the guides G, the continuity of the circular track 9 9 is interrupted at those points where said thread-guides are located, as clearly shown in Figs. 2 and 5.

Any suitable appliances may be made use of for imparting to the horizontal bar 21 the reciprocating movements above referred to.

In Figs. 1 and 6 I have shown a double-acting engine 33, of usual construction, to be operated by steam or compressed air, whose piston-rod is connected by link 35 with the link 22' of the link-motion above described and whose slide-valve 36 has a rod 37, that carries at its outer end two rollers in contact with the opposite faces of a cam-ring 38, secured to brackets on the inner face of the stationary gear 18.

As shown in Fig. 7, the cam-ring 38 has external peripheral projections or cam-faces 38' connected thereto by reverse inclines 38'' and, according to the character of the braid to be formed, has a given number of such cam-faces. In the machine shown it is supposed that the cam-ring has eight of these cam-faces, so that at each revolution of the carrier T the thread-guides G will be moved eight times to the right and eight times to the left of the thread-guides $w'$. As the carrier T rotates the rollers 39 of the engine valve-rods 37 travel around the cam-ring, the slide-valves 36 being reciprocated to admit motive fluid to opposite ends of the piston-cylinder alternately. In Fig. 6 I have shown the valve 36 in position to admit motive fluid to the left end of the piston-cylinder 33, the motive fluid on the right hand of the piston exhausting through 44, the piston with the guide G connected to its rod and moving from left to right across the path of the threads $w$ from one of the guides $w'$. As the rollers 39 ride along an incline 38'' of the cam-ring 38 the valve is moved to the left, and when said rollers reach the outwardly-projecting cam-face 38' the valve 36 is in a position to cut off motive fluid from the left-hand end of the cylinder and admit motive fluid to the right-hand end thereof, thereby moving the guide G, operated by the piston, from right to left, the left end of the cylinder being then in communication with the exhaust 44.

The cam-faces 38' and the intervening spaces of the cam-ring 38 are of course of such a length as to impart the traversing movements to the guides G at proper intervals to carry the threads $k$ across the threads $w$.

The motive fluid is supplied to the valve-chest of the engine through a pipe 43, connected to an internal circular channel of a collar 41, adapted to revolve fluid-tight on the horizontal member of a standard $a$ between the bevel-wheel $q$ thereon and the stationary gear 18, and said motive fluid is supplied to said channel through a pipe 40, extending into said horizontal member of standard $a$. The collar 41 rotates with the bevel-wheel $q$, it being connected thereto by radial arms 43' on said collar, secured by bolts $q'$ to radial ribs $q^2$ of wheel $q$. The described arrangement is clearly shown in Fig. 1.

For the purpose of avoiding shocks which are liable to result from the sudden movements imparted by the pistons to their respective thread-guides G, I make use of suitable buffers, preferably a pneumatic buffer consisting of cylinder 45, containing air, the piston of which cylinder has its rod 45' connected to the link 22' by a pin 45'' passing through a longitudinal slot 22'' in said link, as more clearly shown in Fig. 6.

It will be observed that the cylinder 45 has formed in its wall a longitudinal passage $45^a$ of small cross-sectional area and opening into the cylinder at either end and opening also to the atmosphere midway of its length, the latter opening being normally closed by a screw-plug, so that as the piston in cylinder 33 moves from one end to the other the piston in cylinder 45 is caused to move synchronously, since it is connected to link 22', the fluid in front of the piston in cylinder 45 acting as a cushion or buffer and being gradually forced to the opposite end of said cylinder through said passage $45^a$.

The object of the screw-plug above referred to is to provide means for varying the area of the passage $45^a$, and thereby varying the resistance to the flow of fluid from one end of the cylinder 45 to the other.

I do not desire to limit myself to the appliances hereinabove described for traversing the thread-guides G, as any other suitable appliances may be used. Thus, for instance, I can dispense with the use of fluid-motors and impart to the bars 21, which carry the thread-guides G, a rectilinear reciprocating motion by means of a disk or wheel having a suitable cam-groove, as shown in Figs. 10 and 11, and make use of the spindles 15 for this purpose, whereby the mechanism is materially simplified and the weight of the parts considerably reduced.

The spindle 15, which carries the gears 14 and 17, gearing, respectively, with the toothed members 13 of the bobbin-carriages C and the stationary gear 18, also carries a sleeve 15', loose thereon, to which is keyed a cam-disk 50, provided with a suitable cam-groove 51, and to said cam-disk is rigidly secured a gear 49, in gear with a pinion 48 on a stub-shaft 48', which also carries a gear-wheel 47, driven from a pinion 46, fast on spindle 15, the described gearing being so proportioned as to impart to the cam-disk the proper number of revolutions to each revolution of the bobbin-carrier T.

There is provided for each thread-guide G a crank-shaft 54, mounted tangentially on the left-hand member of carrier T, which shaft has a crank 53 at one end and a radial arm 55 at its opposite end. The pin of the crank 53 carries a roller 52, which projects into the cam-groove 51 of cam-disk 50, while the radial arm 55 is pivotally connected, through a link 56, to the link 22' of the parallel motion hereinbefore described and imparts to the thread-guide G its traversing motion.

As will be readily understood, the roller 52, Fig. 11, working in cam-groove 51 of disk 50, will hold the latter and its sleeve 15' against endwise motion toward the left on spindle 15, Fig. 10, though, if desired, the spindle 15 may be provided with any well-known means to prevent such endwise motion.

From the description of the construction of the machine any one skilled in the art will readily understand its operation, and I deem it unnecessary to enter into a detailed description thereof.

Having thus described my invention, what I claim as new therein, and desire to secure by Letters Patent, is—

1. In a braiding-machine, a carrier, two series of substantially straight thread-guides radially disposed on the carrier, means to rotate one series of guides on the carrier about a straight line or core in a plane normal thereto, means to rotate the carrier and the second series of guides about the core at the same angular velocity as the first series but in an opposite direction and means to reciprocate said second series of guides alternately from one side to the other of the plane of rotation of the first series of guides, for the purposes set forth.

2. In a braiding-machine, two series of thread-guides, a carrier on which said thread-guides are radially disposed with their thread-delivery ends proximate to a central straight line or core, means to revolve one series of thread-guides on the carrier about the core in a plane normal thereto, means to rotate the carrier and second series of guides about said core at the same angular velocity as the first series but in an opposite direction, and means to reciprocate the guides of the second series alternately from one side to the other of the plane of rotation of the first series, for the purposes set forth.

3. A machine for braiding thread on a core moving in a straight line, comprising a circular track concentric with said straight line and having its continuity interrupted at given points, a support for said track, means to rotate the support about the aforesaid straight line, a series of thread-guides carried by said support and means imparting to said guides a traversing motion across the aforesaid track; in combination with a series of bobbin-carriages provided with a segmental toothed rack, a radially-disposed thread-guide carried by each carriage and mechanism for moving said carriages along the said track in a direction opposite to the direction of its rotation, comprising a stationary gear-wheel concentric with the aforesaid straight line, spindles mounted on the aforesaid track-support, each spindle carrying gearing adapted to mesh with the aforesaid segmental toothed racks and stationary gear-wheel, respectively, substantially as set forth.

4. A machine for braiding thread on a core moving in a straight line, comprising a circular track concentric with said straight line and having its continuity interrupted at given points, a support for said track, means to rotate the support about the aforesaid straight line, a series of radially-disposed thread-guides carried by said support and means imparting to said guides a traversing motion across the aforesaid track; in combination with a series of bobbin-carriages provided with a segmental toothed rack, a radially-disposed thread-guide carried by each carriage and mechanism for moving the carriages along the said track in a direction opposite to the direction of its rotation, comprising a stationary gear-wheel concentric with the aforesaid straight line, spindles mounted on the aforesaid track-support, each spindle carrying gearing adapted to mesh with the aforesaid segmental toothed racks and stationary gear-wheel, respectively, substantially as set forth.

5. A machine for braiding thread on a core moving in a straight line, comprising a circular track concentric with said straight line and having its continuity interrupted at given points, a support for said track, means to rotate the support about the aforesaid straight line, a series of radially-disposed thread-guides carried by said support, means to guide threads to said guides organized to maintain said threads at a substantially uniform tension and means imparting to said guides a traversing motion across the aforesaid track; in combination with a series of bobbin-carriages provided with a segmental toothed rack, a radially-disposed thread-guide on each carriage and mechanism for moving the carriages along the said track in a direction opposite to the direction of its rotation, comprising a stationary gear-wheel concentric with the aforesaid straight line, spindles mounted on the aforesaid track-support, each spindle carrying gearing adapted to mesh with the aforesaid segmental toothed racks and stationary gear-wheel, respectively, for the purposes set forth.

6. A machine for braiding thread on a core moving in a straight line, comprising a circular track concentric with said straight line and having its continuity interrupted at given points, a support for said track, means to rotate the support about the aforesaid straight line, a series of thread-guides carried by said support and means imparting to said guides a traversing motion across the aforesaid track; in combination with a series of bobbin-carriages provided with a segmental toothed rack, a radially-disposed thread-guide on each carriage and mechanism for moving said carriages along said track in a direction opposite to the direction of its rotation, comprising a stationary gear-wheel concentric with the aforesaid straight line, spindles, mounted on the aforesaid track-support, each spindle carrying gearing adapted to mesh with the aforesaid segmental toothed racks and stationary gear-wheel, respectively, said gearing proportioned to move the bobbin-carriages at the same angular velocity as that of their track, substantially as set forth.

7. A machine for braiding thread on a core moving in a straight line, comprising a series of radially-disposed thread-guides, means revolving the same about said straight line and means supplying thread to said guides; in combination with a second series of thread-guides, a support therefor, means revolving the support about the aforementioned straight line in a direction opposite to the direction of revolution of the first-named series of guides, and means imparting to said second series of guides a traversing movement across the path of the first series of such, and comprising a parallel motion for each guide having a horizontal bar, to which bar such guide is rigidly secured, and means imparting to the bar to-and-fro movements in a substantially horizontal plane, substantially as and for the purposes set forth.

8. The combination with the thread-guides G, their carrier T and the fixed gear 18, the parallel motions, each consisting of the elements 21, 22', 30 and 31, the spindles 15, their pinions 17 and 46, the gear-wheel 47, said pinion 17 in gear with the wheel 18, and said pinion 46 in gear with wheel 47, the cam-disk 50 loose on spindle 15, the gear-wheel 49 rigidly connected with said cam-disk, the spindle of wheel 47 and the pinion 48 on said spindle in gear with said wheel 49; of the crank-shaft 54, its crank-pin, engaging the cam-groove 51 in cam-disk 50, and having a radial arm 55 linked to link 22' of the aforesaid parallel motion, substantially as and for the purposes set forth.

9. The combination of a thread-guide G, its support, the parallel motion consisting of the elements 21, 22' 30 and 31 for said guide, and the roller-guides 20, 20 for the threads, on said support, the pivot-pins for links 30 and 31, constructed to serve as guides for the threads guided thereto by rollers 20, 20, substantially as and for the purposes set forth.

10. The combination of a thread-guide G, its support, the parallel motion consisting of the elements 21, 22', 30 and 31, for said guide, and the roller-guides 20, 20 for the threads, on said support, the pivot-pins for links 30, 31, said pins slotted longitudinally, said slot flaring outwardly in opposite directions from the axis of the pin, and the perforated guide-plate m secured in the inner half of the slot, substantially as and for the purposes set forth.

11. In a machine such as described, the thread-guide G composed of two side plates 25, spacing-bolts 24 spacing the same and located on opposite sides of the longitudinal center of said plates; in combination with two shorter side plates 27 pivotally connected to the inner end of the side plates 25 and having at their inner end a perforated thread-guide plate 28, and the bolt 23 at the outer end of said plates 25, said bolt slotted longitudinally and said slot made to flare outwardly on opposite sides of the axis of the bolt, and a perforated guide-plate m secured in the inner half of the slot, substantially as and for the purposes set forth.

12. In a machine such as described, a radially-disposed and sector-shaped bobbin-carriage revoluble about a straight line; in combination with a thread-guide at the inner end of and midway between the lateral edges of the carriage, said guide terminating in a tapered end provided with a perforated thread-guide plate, and said carriage provided with bearings for the spindles of a group of bobbins, substantially as and for the purposes set forth.

13. A machine for braiding thread on a core moving in a straight line, comprising a bobbin-carrier composed of two wheels revoluble about said straight line, yokes connecting said wheels at different points of their peripheries, a circular track intermediate of and secured to said wheels, radially-disposed bobbin-carriages, each provided with bearings for the spindles of a group of bobbins, said bearings arranged in arcs of circles concentric with said track, on which the carriages are adapted to travel, and a thread-guide projecting from the inner face of each carriage, and means to move said carriages along the track in a direction opposite to the direction of rotation of the aforesaid carrier; in combination with radially-disposed thread-guides supported in the aforesaid yokes of the carrier, means to impart to said thread-guides a traversing motion across the path of the guides moving on the aforesaid track, and means to guide the threads to the traversing guides and maintain said threads at a substantially uniform tension during the traversing movements of said guides, substantially as and for the purposes set forth.

14. In a machine such as described and comprising a revoluble bobbin-carrier and a circular track secured thereto; a bobbin-frame provided with a thread-guide projecting toward the axis of rotation of the carrier, and a carriage for and to which said frame is detachably connected, said carriage adapted to travel along the track, for the purposes set forth.

15. In a machine such as described and comprising a revoluble bobbin-carrier and a circular track secured thereto; a sector-shaped skeleton bobbin-frame having its radial bars connected by segmental bars concentric with the track and having bearings for bobbin-spindles arranged in arcs of circles also concentric with said track, a thread-guide common to all the bobbins projecting from the frame toward the axis of rotation of the carrier, and a carriage for and to which said frame is detachably connected, said carriage adapted to travel along said track, for the purposes set forth.

16. In a braiding-machine, two series of thread-guides disposed radially about a common center with their thread-delivery ends proximate to said center, means to rotate one series of guides in one direction and the other series in an opposite direction about said center, and means to reciprocate the guides of one series of such alternately from one side to the other of the plane of rotation of the other series of guides, for the purposes set forth.

In testimony that I claim the foregoing as my invention I have signed my name in presence of two subscribing witnesses.

BERNHARD KIRSCH.

Witnesses:
JOSEF RUBARCH,
ALVESTO S. HOGUE.